(12) United States Patent
Wright (10) Patent No.: US 12,440,424 B2
(45) Date of Patent: Oct. 14, 2025

(54) LATCHING SYSTEMS AND METHODS (71) Applicant: The Natural Nipple Corp.

(72) Inventor: Lauren Wright, Tampa, FL (US)

(73) Assignee: The Natural Nipple Corp.

( * ) Notice: Subject to any disclaimer, the term of this patent is extended or adjusted under 35 U.S.C. 154(b) by 531 days.

(21) Appl. No.: 18/081,667

(22) Filed: Dec. 14, 2022

(65) Prior Publication Data

US 2024/0197573 A1 Jun. 20, 2024

(51) Int. Cl.
*A61J 11/00* (2006.01)

(52) U.S. Cl.
CPC .................. *A61J 11/005* (2013.01)

(58) Field of Classification Search
None
See application file for complete search history.

(56) References Cited

U.S. PATENT DOCUMENTS

| | | | | |
|---|---|---|---|---|
| 4,052,230 | A * | 10/1977 | Aylward | C22C 38/60 148/330 |
| 11,305,463 | B2 | 4/2022 | Wright | |
| 2005/0177099 | A1 * | 8/2005 | Dahan | G01F 1/72 604/76 |
| 2014/0131251 | A1 * | 5/2014 | Westrup | A45C 13/02 206/756 |
| 2014/0378946 | A1 * | 12/2014 | Thompson | A61M 1/067 604/74 |
| 2017/0072118 | A1 * | 3/2017 | Makower | A61M 1/067 |
| 2017/0312184 | A1 * | 11/2017 | Lofaro | B29C 33/3878 |
| 2018/0104156 | A1 * | 4/2018 | Mobbs | B29C 64/393 |
| 2019/0291307 | A1 * | 9/2019 | Wright | B33Y 10/00 |
| 2021/0393450 | A1 * | 12/2021 | Arizti | G06Q 30/0631 |
| 2023/0069584 | A1 * | 3/2023 | Zeev | G06V 10/44 |
| 2023/0123238 | A1 * | 4/2023 | Bolten | G06F 30/12 703/1 |

* cited by examiner

*Primary Examiner* — Mohammad Ali
*Assistant Examiner* — Vincent W Chang
(74) *Attorney, Agent, or Firm* — FYPA.legal; Chris Tanner (57) ABSTRACT

A system and method for simulating the natural breastfeeding process both through flow rate and through nipple shape is disclosed. The system provides bottles designed after a woman's own breast, rather than a "one-size fits many" generic bottle sold in stores. The system accurately represents the shape of mother's unique nipple types, and use fluid dynamics analysis to match the flow characteristics of bottle nipples to that of actual lactation averages, incorporating dynamic infant suckling pressures. This results in a threaded nipple attachment which provides an affordable way to closely replicate a mother's nipple in terms of shape and flow, such that a nursing baby is not confused by the difference between the two. This in turn increases latching, both within situations where the mother is asserting strictly natural milk, but also where she is sometimes nursing, and sometimes using baby-formula from a bottle.

16 Claims, 12 Drawing Sheets

The Natural Nipple Latch Match™ Unit $55.00
By Nuture

Infant Age

| Birth to 2 Months | 3-6 Months | 7-9 Months |
| 10-12 Months |

Quantity

− 1 +

Find your LatchMatch™ ℞

FIG. 4A (open position)

FIG. 7 (baby emulator)

LATCHING SYSTEMS AND METHODS

BACKGROUND OF THE INVENTION

In these days of working mothers and breast pumps, infants using bottles can provide huge benefits. However, infants rejecting bottles is a common and well-documented problem. This in turn produces a headache for new mothers who strive to keep their children well-fed and healthy in their earliest stages of development. Part of the cause of this problem is the nipples on the bottles. Many bottle nipples currently on the market are insufficient for providing slower, realistic flow rates for preterm infants.

The embodiments herein simulate the natural breastfeeding process as closely as possible both mechanically (through e.g. flow rate) and physically (through e.g. nipple shape). This results in a competitive market option for parents, using a design that may greatly increase the likelihood of bottle (nipple) acceptance e.g. latching.

SUMMARY OF INVENTION

The premature cessation of breastfeeding causes a large number of deaths in children under five, and costs countries and insurance systems a large amount of money. The system 100 enables mothers to overcome the barriers they face so they can continue breastfeeding for the recommended minimum of 2 years. A primary challenge that mothers face when breastfeeding is "nipple confusion". This unwanted outcome can occur after the introduction of a traditional bottle nipple which causes frustration when the shape and flow rate does not naturally match the mother's.

Many moms want a bottle that is designed after her own breast, rather than a "one-size fits many" generic bottle sold in stores. Accordingly, the embodiments herein create molds and then products that accurately represent the shape of mother's unique nipple types, and use fluid dynamics analysis to match the flow characteristics of bottle nipples to that of actual lactation averages, with regard to dynamic infant suckling pressures. Modeling maternal geometry.

The threaded nipple attachment 604 provides an affordable way to closely replicate a mother's nipple in terms of shape and flow, such that a nursing baby is not confused by the difference between the two. This in turn increases latching, both within situations where the mother is asserting strictly natural milk, but also where she is sometimes nursing, and sometimes using baby-formula from a bottle.

This disclosure also encompasses creating products and services designed to support continuity between bottle and breast, reduce latching problems, and promote more and longer breastfeeding. This can have a significant impact on mothers and babies, as breastfeeding is a universally-agreed principle by any/all health insurers.

Breastfeeding has benefits for both the baby and the mother. Unfortunately, where breastfeeding is constrained or impaired, mothers and babies can have impaired health including death.

Prolonged breastfeeding and allowing for "skin to skin" contact which in turn enables breastmilk to continually act in establishing immunities (both of the mother and of the baby), promoting protective neurological development. One way this is achieved is by genetic optimization through microbiome establishment, which helps prevent the long-term detrimental effects of gut bacterial dysbiosis.

In addition, breastfeeding is associated with an IQ increase of 3 to 4 points, and yet only 40 percent of children younger than six months are exclusively breastfed. There are several reasons why breastfeeding does not occur. One is that mothers with jobs where the baby is not present have a harder burden. Another reason is a type of societal resistance, as some even educated persons consider breastfeeding to be crude or neanderthal.

The customers of the embodiments herein would include both expecting mothers and breastfeeding mothers including and especially those mothers with an exceptional need such as Neonatal Intensive Care Unit (NICU) infants, twins, and mothers who want to continue breastfeeding upon returning to work.

The embodiments herein create products and services designed to support continuity between bottle and breast, reduce latching problems, and promote breastfeeding, can have a significant impact on mothers and babies. Contrary to the society resistance referred to above, prolonged breastfeeding and allowing for skin to skin contact enables breastmilk to continually act in establishing immunity, promoting protective neurological development, and genetic optimization through microbiome establishment, thus preventing the long-term detrimental effects of gut bacterial dysbiosis. In addition, breastfeeding is associated with an IQ increase of 3 to 4 points and only 40 percent of children younger than six months are exclusively breastfed. The value can be seen psychosocially and economically by saving breastfeeding mothers money, time, preventing latch frustration and guided clinical support. For hospitals, the system 100 is valuable in reducing length of stays, and reducing hospital treatment costs. This includes one of the most expensive hospital costs, NEC-Sepsis.

DETAILED DESCRIPTION OF THE DRAWINGS

DETAILED DESCRIPTION OF THE PREFERRED EMBODIMENTS

Figure 1:
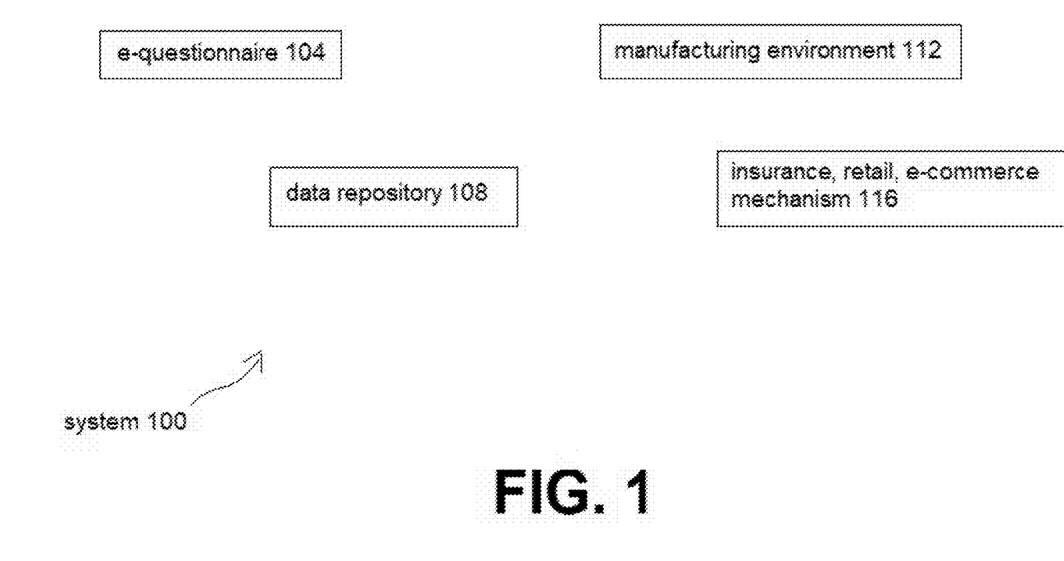
FIG. 1 shows a system comprising an e-questionnaire, data repository, manufacturing environment, and insurance, retail, and e-commerce mechanism.

FIG. 1 shows a system 100 comprising an e-questionnaire 104, data repository 108, manufacturing environment 112, and insurance, retail, and e-commerce mechanism 116. The system 100 produces specific-sized threaded nipple attachments that mimic shape, feel, and contour of a human nipple, using an algorithm for finding a match with one of a plurality of existing pre-fabricated nipple designs. The data-accuracy, e-commerce and insurance mechanism 116 arranges for properly-fitted nipple products to reach the mom-baby teams.

The system 100 thus strives for effective, data-driven milk-flow from a safe, familiar, comfortable source that a baby will latch onto without hesitation. This in turn provides a great deal of health-gain and professional-gain to both mother, baby, and spouse. This is at least because the system 100, properly implemented, frees up the mother to have an unusual work schedule or situations where the baby is latching. The system 100 thus facilitates effective latching including where the baby is not always in physical presence of the mother.

The system 100 is aimed at a variety of moms. Some may occasionally uses breast pump and stores milk when lactating, but where baby is not present. Meanwhile, other moms may never store their milk at all. In these cases, when in the presence of their baby, they nurse the baby from their breast. However, if not present with the baby, and feeding time comes, that baby receives formula, not breast milk from a bottle. The embodiments herein thus accommodate a variety of nursing styles.

In either of these cases, the mom is still nursing. She may note that sometimes the baby rejects a bottle in favor of live breast. For working moms who must spend hours/day away from the baby, this is non-optimal outcome. While its good that the baby is breast-feeding, inheriting the mother's immunities, that baby may still not be getting nourishment at the right times of day. This can in turn result in stomach problems due to erratic feeding. Substituting a formula-bottle during periods of mom-not-present, and then nursing when-present, is also possible. The important principle here is to preserve the baby latching to both the mother's nipple and also, at a times, a bottle.

Figure 2:
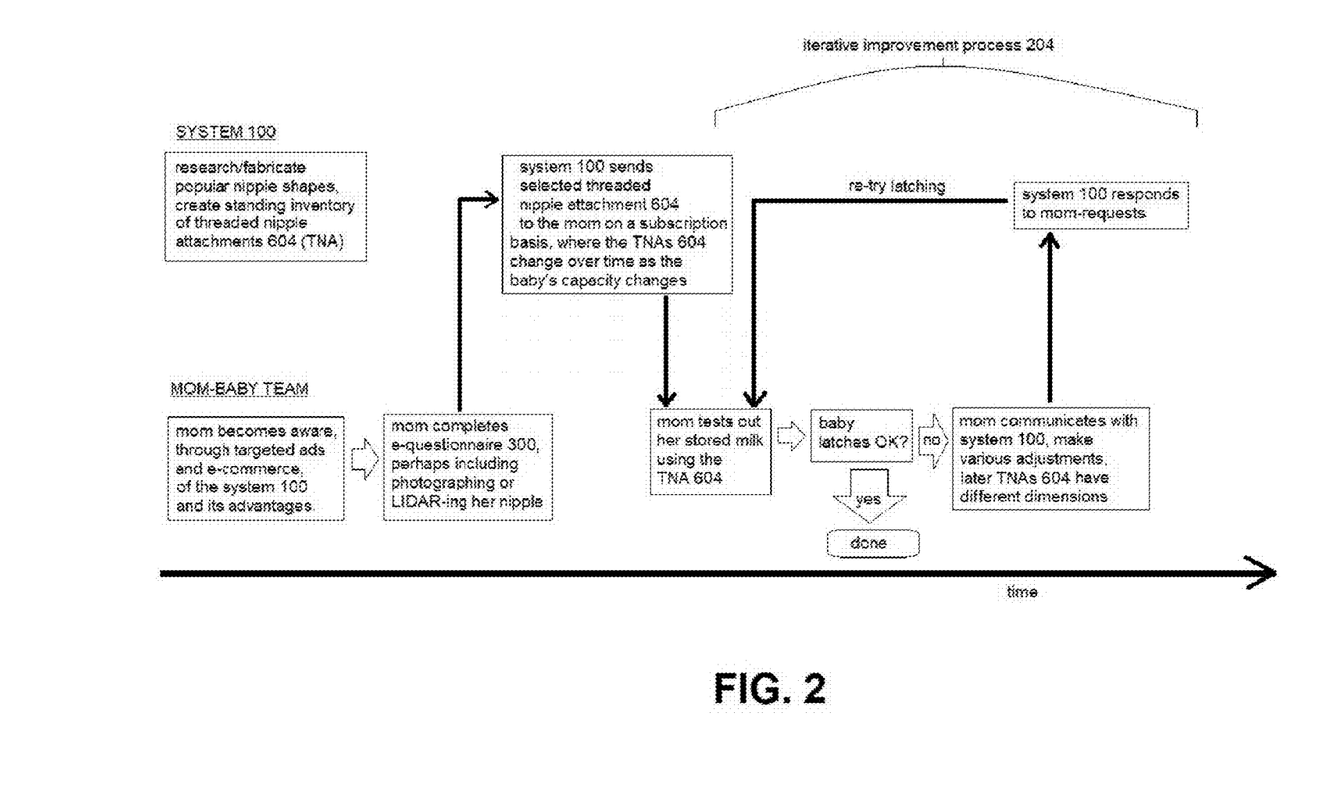
FIG. 2 summarizes the above in a type of flowchart, showing a sequence of steps of how the system functions.
Figure 3A:
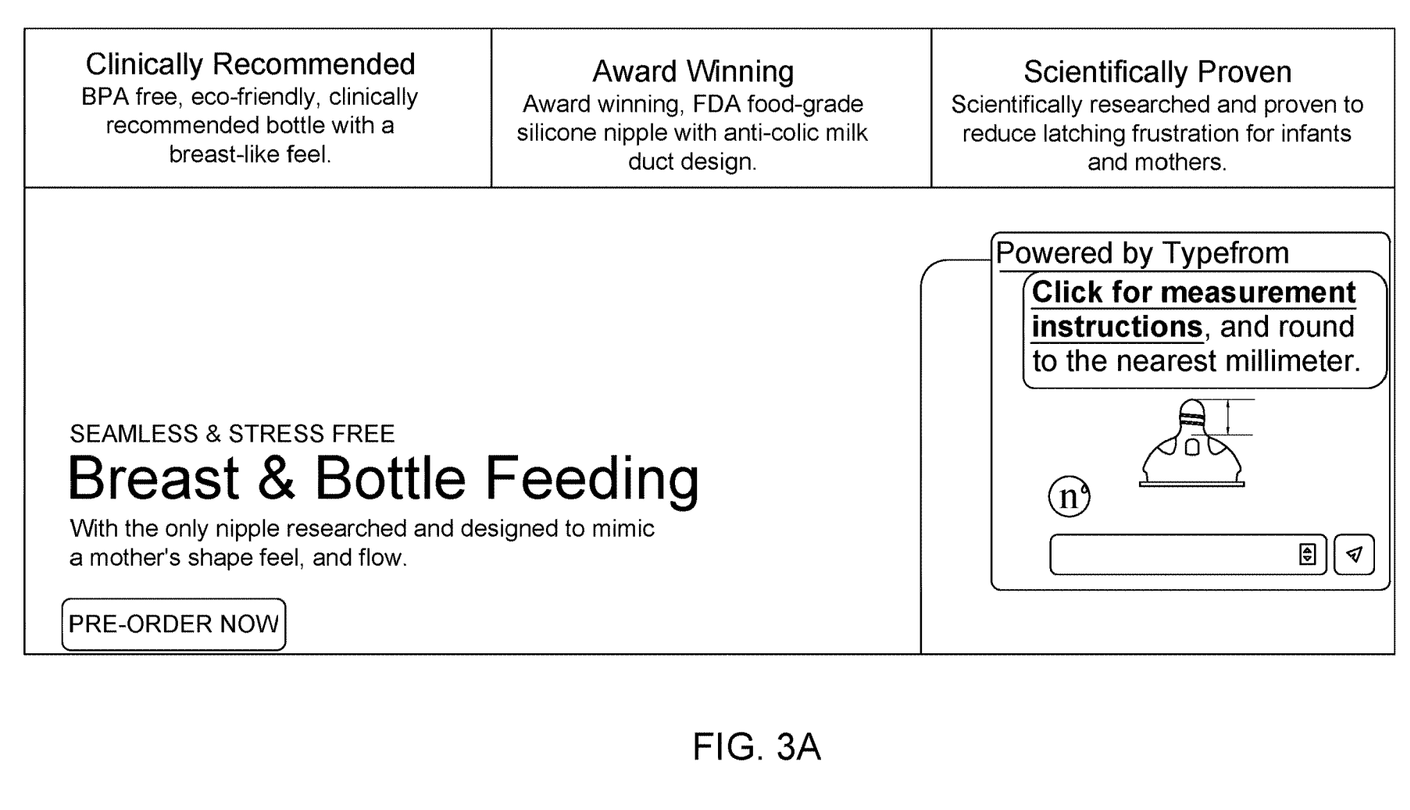
FIGS. 3A-3B-3C and 3D shows GUIs within the e-questionnaire.
Figure 3B:
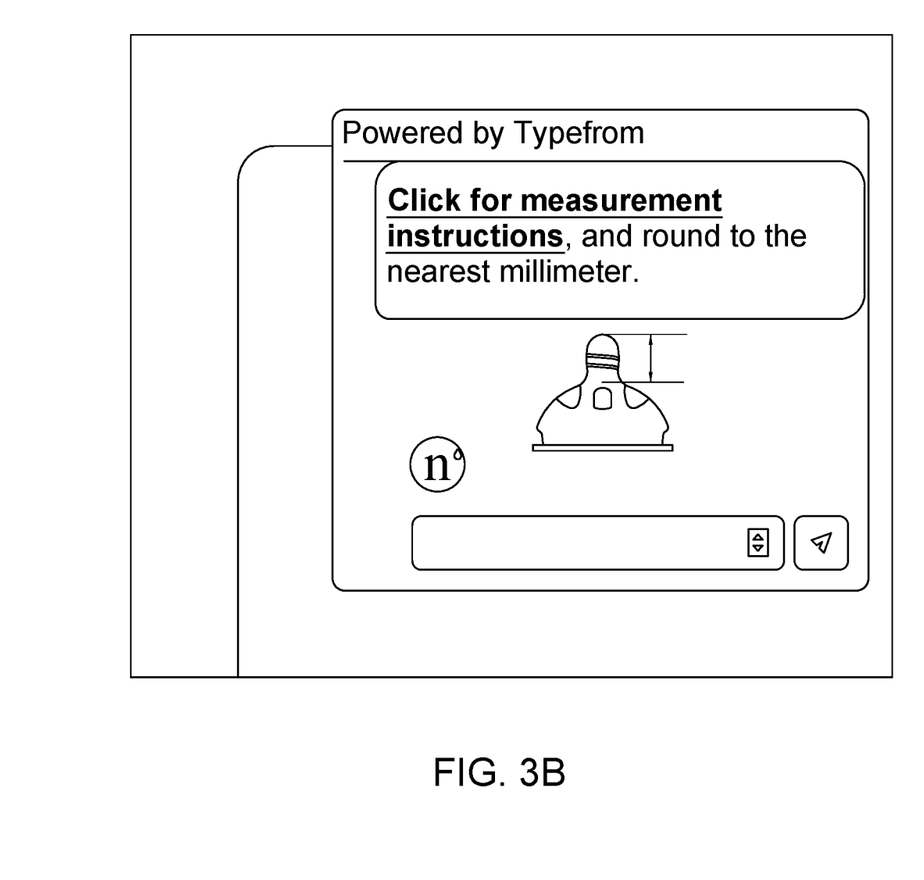
Figure 3C:
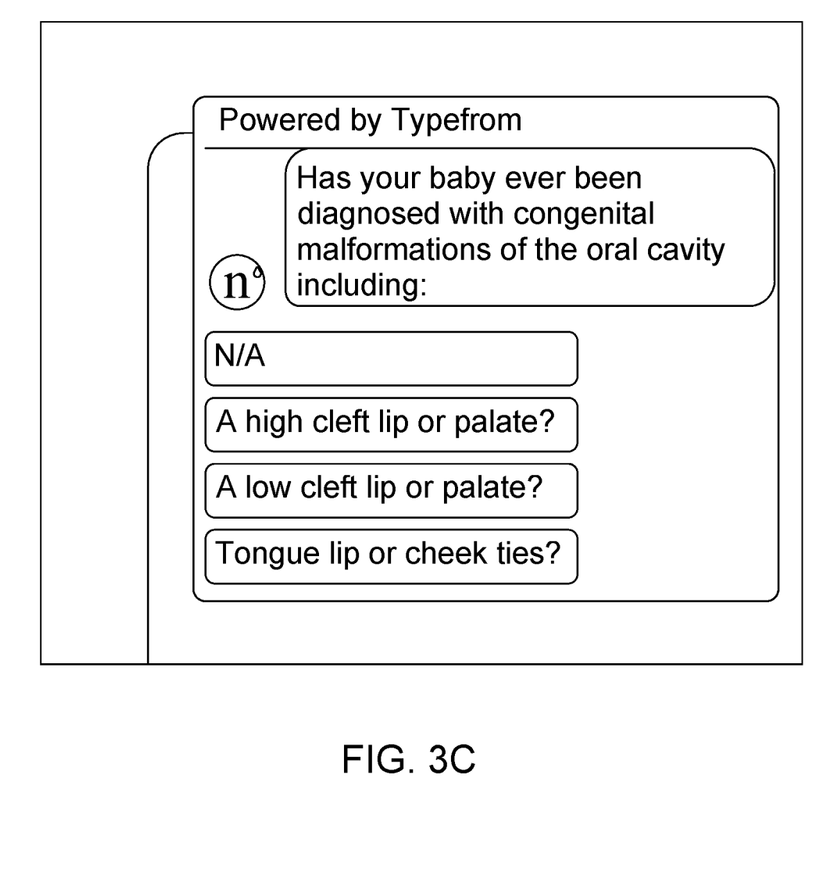
Figure 3D:
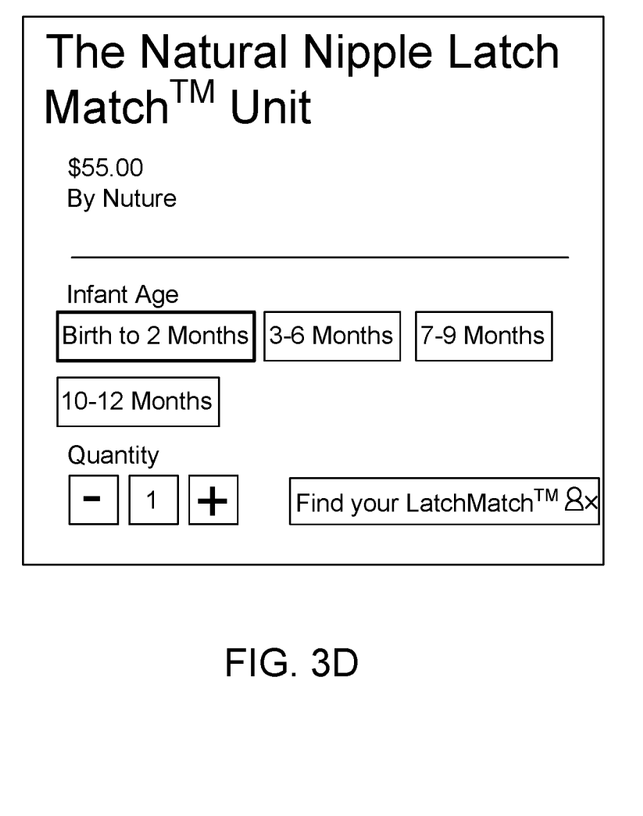

FIG. 2 summarizes the above in a type of flowchart, showing a sequence of steps of how the system 100 overcomes these and other problems. For brevity, the description below is longer and more prolix than the terse aphorisms in FIG. 2, but the two should be considered roughly equivalent. To start, various moms complete the e-questionnaire 300 about nipple, baby, weeks since baby-birthdate, etc. Other information is also assessed, as shown at least within FIGS. 3A-3D.

A mom may also photograph here nipple (using e.g. LIDAR) and sends to the system 100, which figures out a lot of factors about mom-baby team, figures out which threaded nipple attachment 604 to send to the mom. The system 100 then periodically sends a properly-configured threaded nipple attachment 604 to the mom, over time e.g. 2 years, where those threaded nipple attachments 604 change over time based on the baby's changes, for example changes to the lumen 616. The mom tests out the system 100, and all parties experiment and iterate to find an appropriate solution, using an iterative improvement process 204 shown in FIG. 2.

The mom tests out the threaded nipple attachment 604 with baby. If latching did not occur or was resisted, the system 100 can help the mom get past this, partly by trying to control all variables to remove any differences between the system 100 milkflow and the mom-baby natural milkflow. This includes but is not limited to determining what is different in the environment as viewed by the baby, whether the milkflow is higher, lower, thicker, thinner, warmer, colder, or other variable, from the natural mother. The system 100 has experience in knowing how to remove the gaps between the milkflow of the system 100 and the mom-baby natural milkflow. That is, the system emphasizes the relationship between nipple shape and milk-flow, and that the embodiments herein effectively achieve and track that relationship. It is important to note the subscription-based context of the system 100, i.e. that a new threaded nipple attachment 604 is sent every e.g. 2 months, having for example differing sizes of lumen 616 adjusted to accommodate the baby's increase in milkflow.

The e-questionnaire GUIs 300 thus gathers mom-based measurements, prompting them using convenient GUIs (FIGS. 3A-3D) carefully designed to increase accuracy and reduce errors, and also not over-burden the mom with a tedious data-entry exercise. The end result is that the mom gets paired with one of a variety of manufactured nipples that is closely matched to her size, and likely to be effective in getting her baby to latch.

Numerous information-flows are used in making an assessment of the mother's nipple, including polling of the mothers, the e-questionnaire 300, and/or scanning using a mobile device e.g. an iPhone. One possible way to assure more accurate self-measurement is using LIDAR available in a typical iPhone, which obtains breast-nipple measurements directly from the mom's skin. Other measurement mechanisms not limited to iPhones or LIDAR can also be used.

The system 100 works best when the mom can provide accurate information about her own nipple, plus info on term of the baby. This is achieved using the e-questionnaire 300 partially shown in FIGS. 3A-3D. There are numerous features within the e-questionnaire 300 that are not overtly shown, such that the information in FIGS. 3A-3D is chosen merely for brevity and convenience. Accordingly, the embodiments herein should not be considered as limited exclusively to that shown in FIGS. 3A-3D.

As discussed within U.S. patent Ser. No. 11/305,463 Issued Apr. 19, 2022, the contents of which are incorporated by reference herein, they system 100 develops target flow rates for preterm birth all the way to 24 months of breast-feeding.

Remember, the babies feed differently as they grow. The embodiments herein factor and accommodate these changing milkflow requirements. Effectively emulating a woman's natural milkflow involves achieving very specific, targeted milkflows, which change over time. A baby does not know much, but that baby is expecting a certain target flow. The mother's self-reported lactation data generates aperture (lumen) sizes, and also an average flow rate needed for each staged feeding among other data. If that baby gets an unexpected milkflow, either higher, lower, thicker, thinner, warmer, colder, that baby may balk, sense an unfamiliar shape, feel, or flow, and may not latch. The embodiments herein strive to avoid that outcome, strive to achieve the highest possible rate of baby latching. This in turn results in a type of mother-empowerment, including workplace empowerment.

This is how the e-questionnaire 300 utilizes maternal measurements, by prompting the moms, and doing error-correction and getting the mom\baby team paired with one of the nipple shapes (sometimes referred to as SKUs, when referring to the system 100 in its commercial context).

Thus, when the moms enter their nipple-dimensions, the e-questionnaire 300 directs that mom to the correctly-shaped threaded nipple attachment 604. She can either order it, or direct her insurance company to order it and ship it. In the case of third world countries, an NGO or community-resource organization may provide the threaded nipple attachments 604 and other needed equipment. The system 100 includes expanding the algorithm for future SKUs of the threaded nipple attachments 604 (other than the base-4 TNAs 604 shown herein) and other corollary products. As stated, the embodiments herein encompass a variety of biz-models, including a variety breast-feeding products related to improving any/every auxiliary product related to breast-feeding, better-fitting breast pumps, nipple shields, and other baby-feeding items.

The e-questionnaire 300 and the data repository 108 also accommodate special cases and unusual measurements, where possible. For example, an early question is does the baby have a malformed oral cavity. If so, the system 100 provide materials to help the mom measure the baby's palate and get the mom-baby team paired with the correct nipple size.

During an initial measurement process, the e-questionnaire 300 also suggests using a bit of ice on the nipple to make it protrude and be more measurable. Further, the e-questionnaire 300 comprises measurement instructions for gathering their nipple length (in millimeters), using e.g. a ruler app or calipers to measure the nipple.

As explained earlier, once the mom inputs her nipple data and finishes the e-questionnaire 300, she will be sent a suitable threaded nipple attachment 604 via UPS or other carrier. In low-income cities or $3^{rd}$ world countries where home-delivery is constrained, the mom might visit her local community-health center and pick up the threaded nipple attachment 604 there.

The system 100 is refined in taking nipple measurements and finding appropriate sizes and configurations of manufactured nipples that an infant will latch to. The system 100 has learned a lot about effective measurement, proper usage of milkflow data, and maximization of latching. Further, the system 100 has an inventory of existing nipple sizes that is best for most moms, regardless of how unique or unusual her dimensions. This is part of the iterative improvement process 204 shown in FIG. 2. As stated, the system 100 emphasizes the relationship between nipple shape and milkflow, and that the embodiments herein effectively achieve and track that relationship.

The continual-feedback nature of the iterative improvement process 204 results in a business model where the longer the system 100 stays in operation, the more efficient and widely-usable and scalable it becomes. This includes accommodating "outlier" sizes and shapes of nipples. Within this specific disclosure, for purposes of enablement and clarity, exactly four SKUs will be discussed, but the embodiments herein should not be considered as limited exclusively thereto.

The system 100 provides numerous shapes (SKUs) of threaded nipple attachments 604, such that four should not be considered limiting, but instead merely a convenient example for this patent disclosure. As more information comes in about commonality of nipples, a bell-curve of threaded nipple attachments 604 can be established. In mass-marketing the system 100, the center of the bell-curve will be emphasized for the threaded nipple attachments 604. However, outlying and lesser-used sizes and shapes of threaded nipple attachments 604 will also be manufactured and included in the system 100.

Commercial Advantages

Using the system 100, mothers miss less work, yet still can feed their babies with their own milk, or combination of alternating milk and formula, and yet remain part of labor pool. Further, the embodiments herein comprise a variety of breast-feeding products related to improving any/every auxiliary product related to breast-feeding, better-fitting breast pumps, nipple shields, and other baby-feeding items.

The safest and healthiest infant feeding method, breast-feeding is also the least expensive. For many poor households, the prohibitive cost of breastmilk substitutes puts this option completely out of reach. For others, the impact of formula purchases on the household budget can be crippling. This is especially true when the unanticipated additional cost of health care for the sick infant takes its toll.

When infant illness requires mothers to miss work, employers and the economy are also affected.

Healthcare Advantages

Using the system 100, babies are better-immunized, thus less doctor visits. The mother's milk is far better for the baby's health than any substitute-formula.

Insurance Advantages

Using the system 100, babies are better-immunized, thus less insurance claims. The mother engaging in her natural ability to nurse also has health-advantages to the mother, thus, again, less insurance claims.

Quality-of-Marriage Advantages

Using the system 100, mothers miss less work, remain part of labor pool, thus family income remains both higher and more stable. The marriage has less money-anxiety, a well-known marriage killer.

Method of Manufacture: Overview

The system 100 takes user-provided or user-scanned information and generates a 3D printed mold and offset to create the steel liquid injection mold 400 having four cavities, forming the four different shapes $416_{1-4}$ for threaded nipple attachments 604 discussed earlier. Within this disclosure, the nipple opening may sometimes be referred to as "lumen".

The steel liquid injection mold 400 creates the four main shapes $416_{1-4}$ used to eventually result in the threaded nipple attachment 604. Afterwards, the pneumatic press 500 makes the lumen 616 within the threaded nipple attachment 604. Data-factors considered in forming the four shapes $416_{1-4}$ comprise at least: nipple length, nipple width, lumen size, and potentially other factors.

Figure 4A:
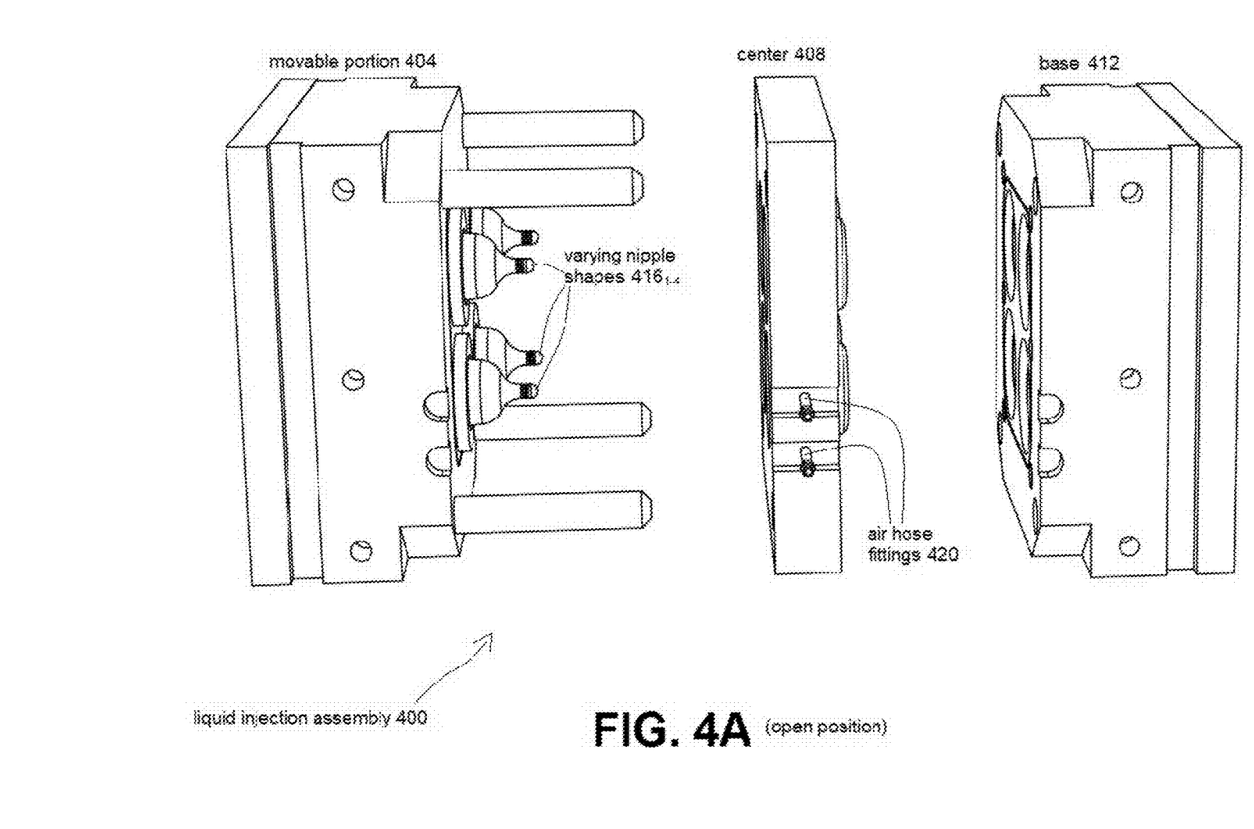
FIGS. 4A (open) and 4B (closed) show a steel injection mold comprising a movable portion, center, and base.
Figure 4B:
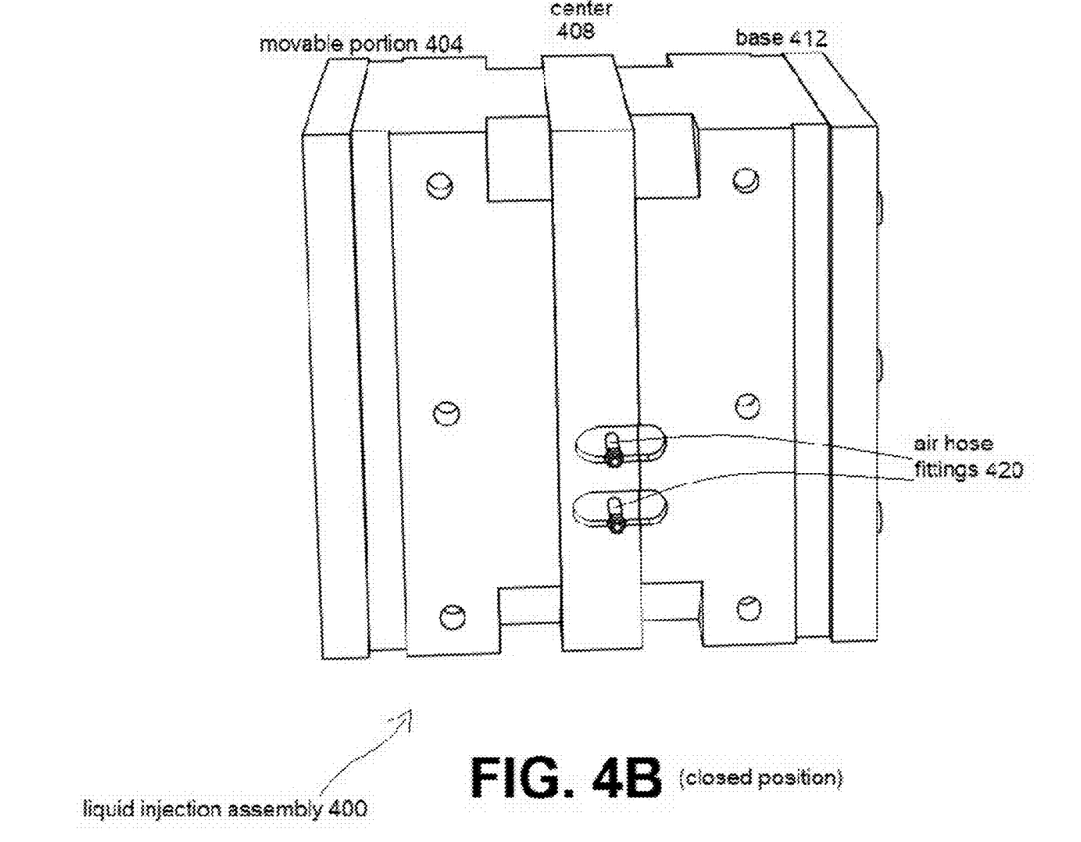

As shown in FIG. 4A, the steel injection mold 400 comprises a movable portion 404, center 408, and base 412. The movable portion 404 further comprises the plurality of carefully designed nipple contour-shapes $416_{1-4}$ which (during use) form a portion of the threaded nipple attachments 604. While FIG. 4A shows four nipple contour-shapes $416_{1-4}$. That is for convenient illustration only, so that the embodiments herein should not be considered as limited exclusively thereto. Many other amounts besides just four contour-shapes 416 are contemplated. FIG. 4B shows the steel injection mold 400 in a closed position.

Figure 5:
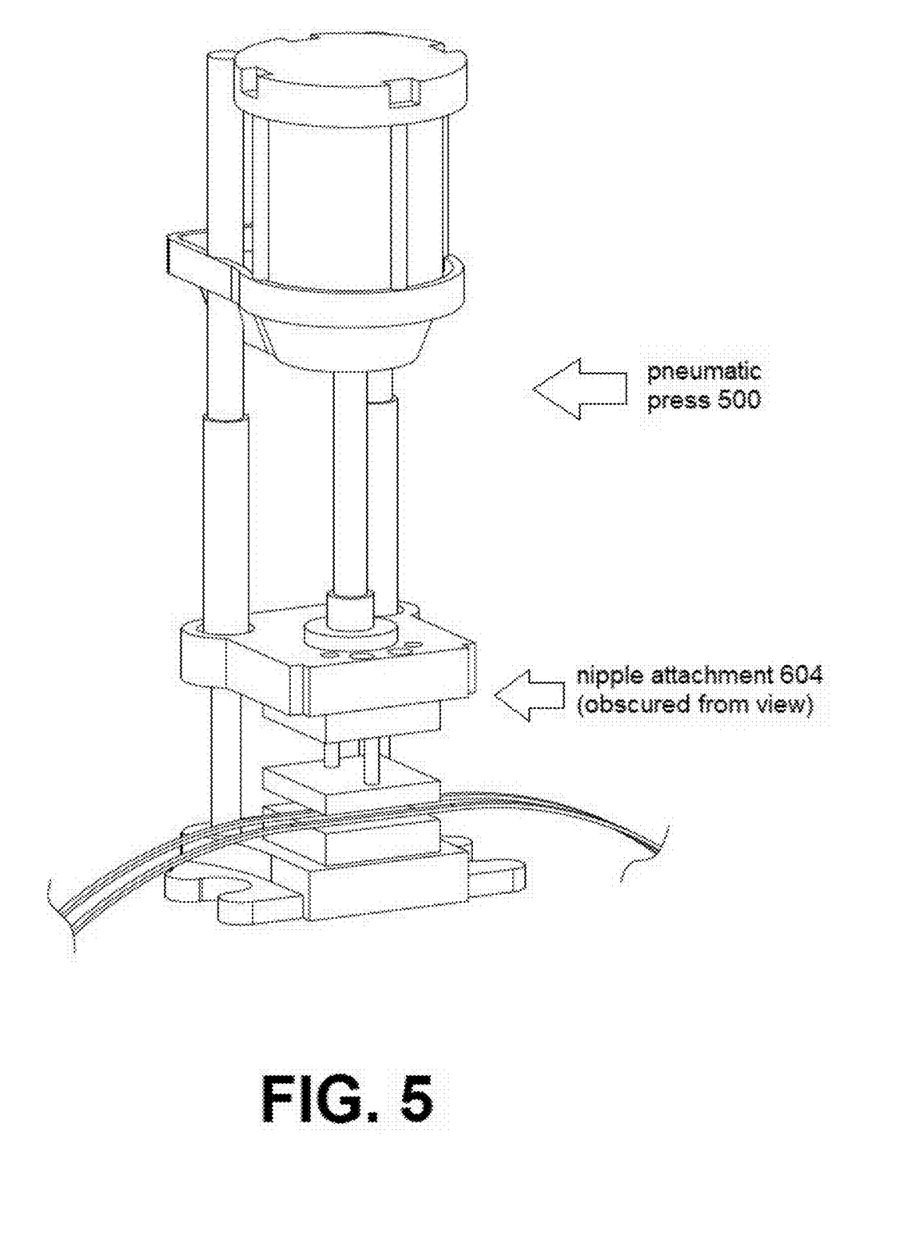
FIG. 5 shows a pneumatic press.

The pneumatic press 500 is shown in FIG. 5. The pneumatic press 500 is helpful for producing accurate lumens 616. The pneumatic press 500 achieves a lumen 616 yielding consistent flow rate at or below 2.2 mL/min (target), in accordance with the average suction rate of preterm infants. This in turn produces quality supply on a scale of ~20,000 samples/yr.

The system 100 achieves milkflow rates well within the target shown above, because of the advantages of producing lumens using the pneumatic press 500. This manufacturing method proved to be consistent, rapid, and achieves an efficient, scalable manufacturing process of producing a consistent human-accurate size of lumen 616 in every manufactured threaded nipple attachment 604.

Automating the lumen production process was found to be most beneficial for both quality and consistency, eliminating human error, and ensuring the lumen is both centered and circular in every threaded nipple attachment 604 produced.

Method of Manufacture: Creation of Contour-Shapes $416_{1-n}$.

The contour-shapes $416_{1-n}$ shown in FIG. 4A do not start out as steel. The contour-shapes $416_{1-n}$ are based on the mom-entered data from the e-questionnaire 300, as well as empirical data from years of research into nipple-dimensions. The processed data is made into a mold, which can be constructed from any relatively strong, heat-resistant material. In this case, an epoxy resin solution is dried to create negatives of the prototype. Resulting samples can be made by injecting or otherwise pouring the desired material in the mold, producing a near-identical copy of the original. In an embodiment, a 2:1 A-B mixture can be used to simulate the flexible silicone used in finished, baby-ready versions.

To begin, a molding box is prepared using 3D-printed material. Once secured, the epoxy solution is poured inside, filling the internal space of the sample. This particular glass solution dries within a known period of time, upon which the completed internal negative is removed.

Next, the completed internal negative is bolted to an acrylic base on the bottom of the molding box, and a sheet of wax paper is placed in between the acrylic and molding box to prevent sticking. The needle is secured through the internal negative before placing the manufactured sample on top, flipping the box over and once again filling it with epoxy resin, up to the top of the sample. Once dry, this yields the external negative of the sample nipple. The mold may be altered and improved to minimize the presence of any air bubbles.

At this point, the manufacturing process has completed, resulting in both an internal and external negative of a desired sample nipple-shape. These can then be used in tandem to create near-identical iterations of the sample with the specified lumen size and shape. In short, the external negative is filled with the desired liquid material. Once situated, the material is left to solidify, resulting in a completed nipple prototype. This prototype eventually ends up being used to create one of the nipple shapes 416 (FIG. 4A).

Moving to FIG. 5, the pneumatic press 500 uses shots of compressed concentrated air to punch through the composition/material of the threaded nipple attachment 604. This results in creating a lumen 616 quickly and accurately. Any variance to the lumen's position on the nipple head, is reduced through precision manufacturing, including but not limited to machine automation. The composition/material of the threaded nipple attachment 604 is typically a silicone-based composition, which can be difficult to achieve accurate punctures. However, the pneumatic press 500 overcomes this problem by generating lumens (punctures) of a very high quality.

The pneumatic press 500 is more scalable than injection molding, by eliminating the startup time for creating molds, instead allowing blank samples to be punched at various sizes in an assembly line fashion. This is helpful for not requiring multiple molds to accommodate a wide range of sizes of lumen 616. The end result produces consistent, more accurate-sized lumens 616, and is more applicable to a mass-scale assembly line setting. Significant cost-savings is thus achieved.

Figure 6A:
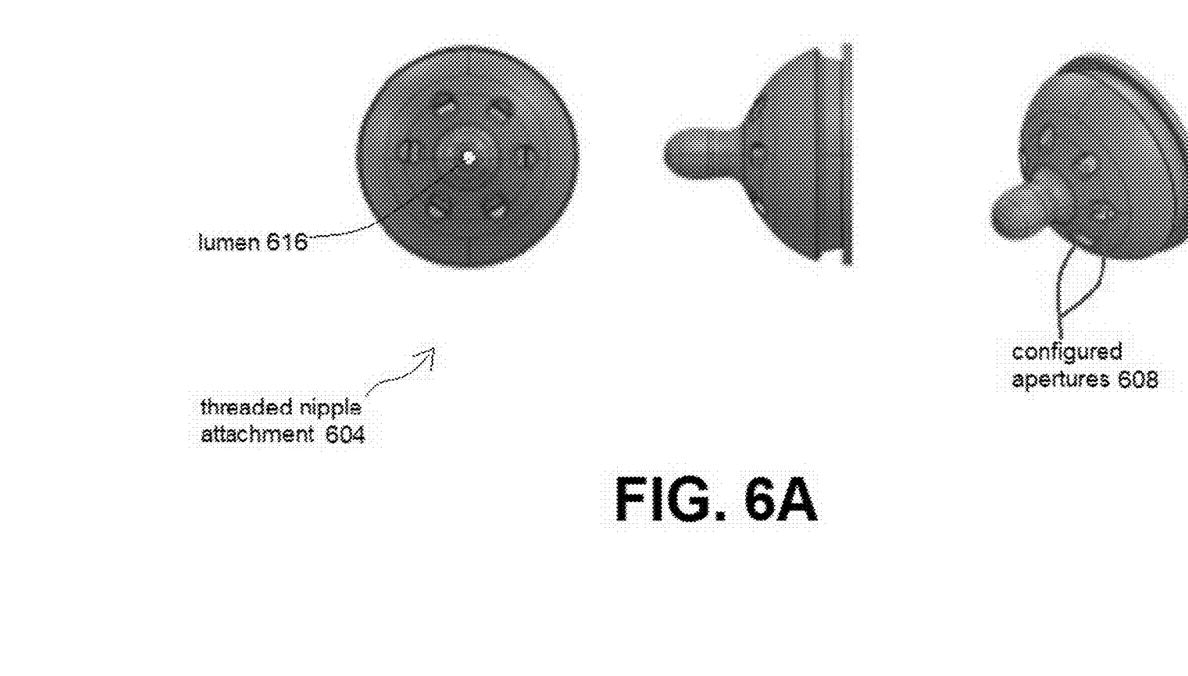
FIGS. 6A and 6B show the threaded nipple attachment.
Figure 6B:
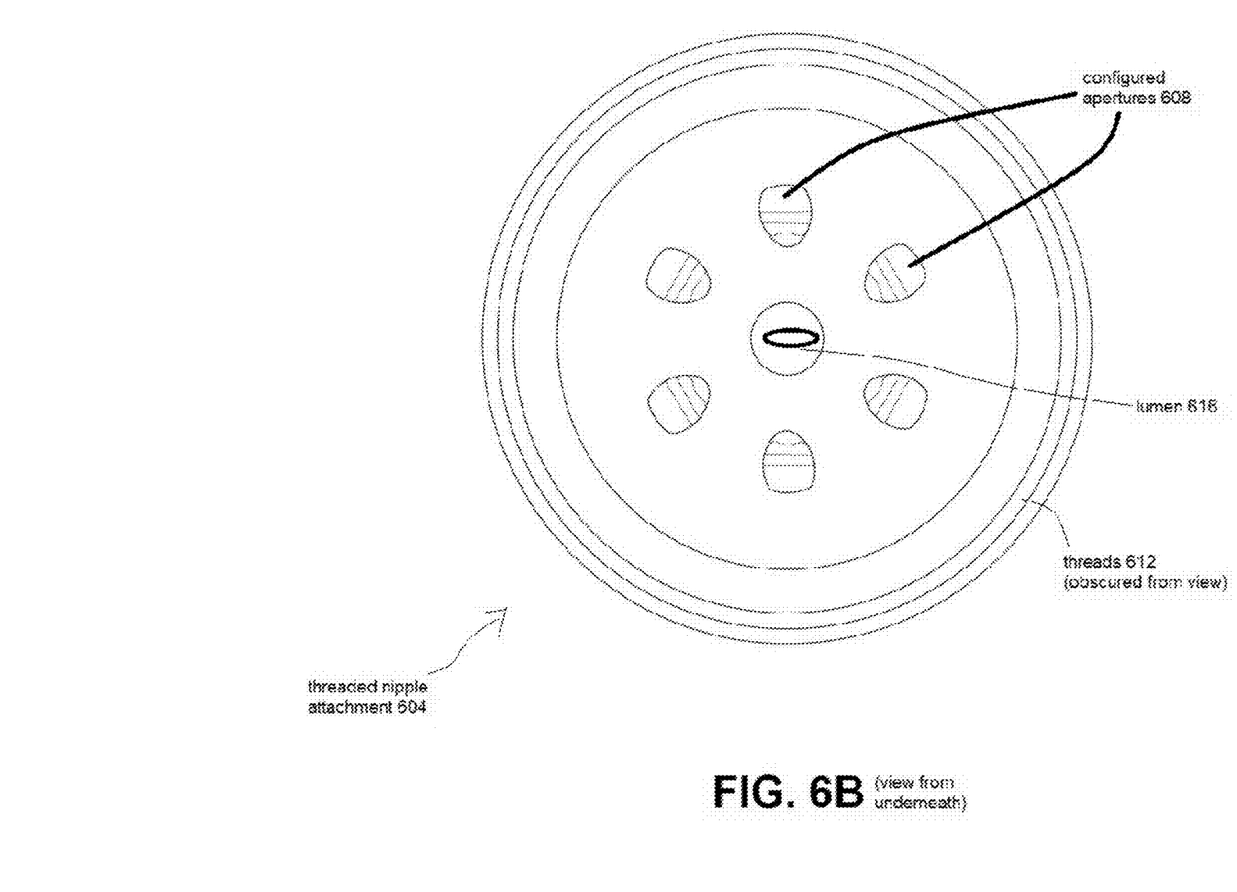

FIGS. 6A-6B shows the threaded nipple attachment 604 comprising a plurality of configured apertures 608 and a lumen 616. While FIG. 6A shows six apertures 608, other amounts can be included. The apertures 608 are included within the external negative to create more space for air bubbles to escape, as well as other reasons. These apertures 608 are not fixed but are instead configurable. The longer the system 100 is used, the younger and fresher it gets, the more accurate its data-gathering gets. TO that end, the apertures 608 will be configured and re-configured in a variety of ways responsive to customers and mom-baby teams. This aspect is shown partly in FIG. 2 as the iterative improvement process 204.

The embodiments herein strive for accuracy of the lumen 616, which in turn results in more accurate data-driven milk-flow outcomes. It's one thing to emulate actual human nipple shapes, that is difficult enough. But it's much more difficult to emulate a natural shape of a mom's nipple opening (lumen) within that nipple. Even though every woman has two nipple apertures, its amazingly difficult to get the lumen sizes exactly right. Also, even the most astute mom cannot self-measure her own lumen. Further, on any woman, her two lumen 616 may not be equal.

FIG. 6B also shows the threads 612 of the threaded nipple attachment 604. However, the expression "threaded nipple attachment" was chosen for its clarity and instant recognition, as many baby-nipples are attached to baby-bottles in a threaded context. However, despite this name, this is not to preclude other types of attachment to a baby-bottle, such as snap-on. In other words, the word "threaded" within "threaded nipple attachment 604" should not be considered as limiting.

Vacuum Pump Baby-Emulator 700

Figure 7:
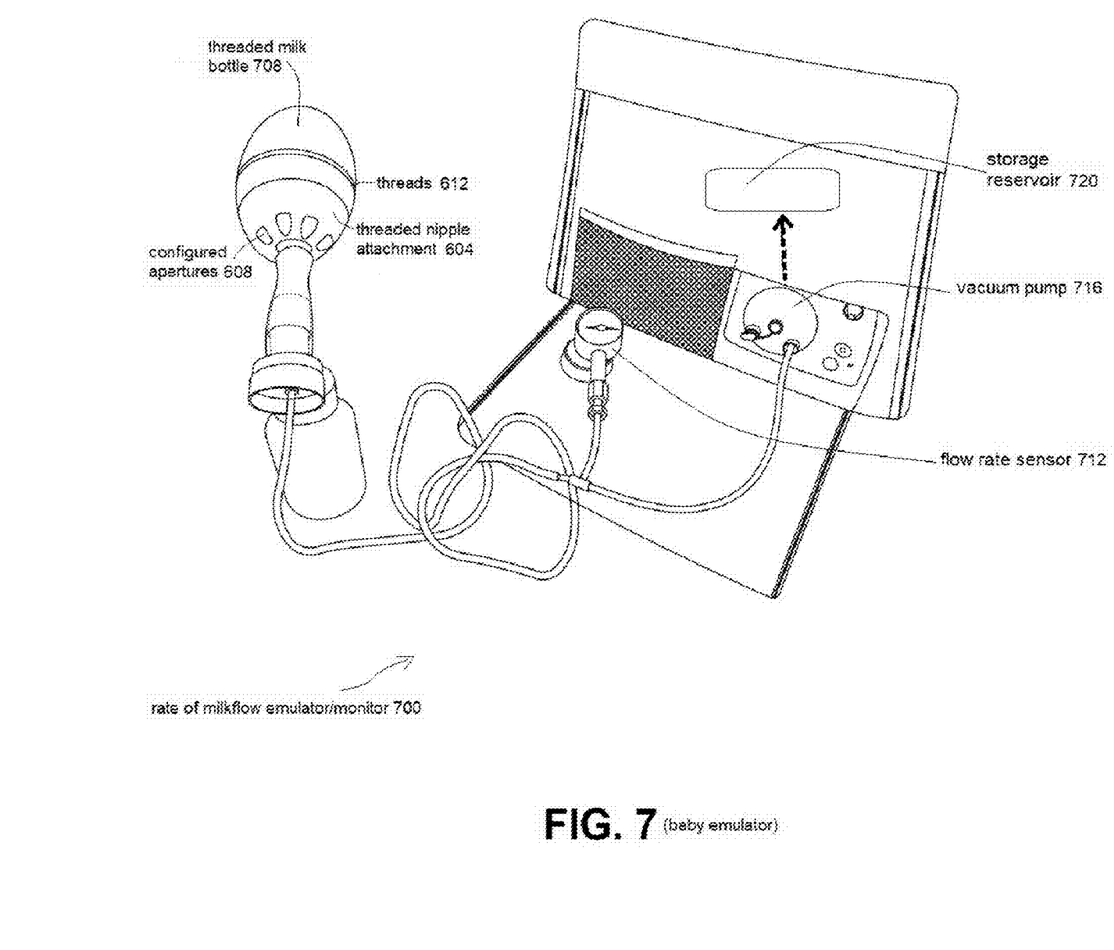
FIG. 7 shows a milkflow emulator/monitor (AKA baby-emulator).

A milkflow emulator/monitor 700 (AKA baby-emulator) is shown in FIG. 7. The vacuum pump 716 is designed to emulate the sucking/feeding capacity of a feeding baby at 0-24 months. This baby-emulator 700 is useful for replicating milkflow that occurs in a typical mom-baby team, all through the 0-24 month period, and assuring that a proper chosen nipple attachment 604 and lumen 616 are milk-flowing at the proper rate, according to the natural rate of growth and change in the mom-baby team. Again, as stated, this reinforces the point that the system 100 emphasizes the relationship between nipple shape and milkflow, and that the embodiments herein effectively achieve and track that relationship.

Having bottle nipple prototypes that accurately represents a mother's unique nipple type is crucial to matching lactation flow rate averages. Conducting fluid dynamics calculations to determine the flow rate through the embodiments herein that provably matches the maternal flow rate data collected over the first year of breastfeeding.

Volumetric milkflow rate is a function of multitude of factors, but an important one is design of the nipple lumen 616, and also the age and appetite of the specific baby, which changes a lot over the first 24 months.

In an embodiment, the speeds for the vacuum pump 716 are reflected in the data as their respective vacuum pressures, measured using the flow rate indicator 712 (pressure gauge). The gauge measures vacuum pressure in increments of 0.5 inHg (12.5 mmHg), and so readings may vary by +/−0.25 inHg (6.25 mmHg). This measurement process performed by the milkflow emulator/monitor 700 is suitable for validating that the threaded nipple shape 604 and lumen 616 are milk-flowing at the proper predetermined target rates for lactation averages obtained from nursing moms, all the way through their 0-24 month periods. Again, this in turn facilitates the overall goal of the system 100, specifically achieving data-driven milk flow that correctly emulates a baby's feeding habits, including the mother's milk and her immunities and strengths therefrom. Mothers properly breast-feeding their babies also receive tangible measurable medical gains.

Factors considered in arriving at a suitable milkflow-rate comprise vacuum pressure (the suction created by the baby, varies according to the age of the baby), initial mass of the baby, final mass of the baby, length of time that suction occurred, and lumen size. An optical microscope is helpful to determine flow rate data, and also lumen diameter measurements. By factoring in and managing these controllable variables, accurate milkflow can be assured for any given nipple attachment 604. The end result is that the baby is perfectly happy with either a) mom's nipple or with b) the carefully selected threaded nipple attachment 604 that emulates a).

The emulation data obtained herein encompasses a lot of different ways to achieve effective emulation, including choosing potentially seven lumen-sizes, and 95 flow-rate data points, to find the best match.

To best replicate a bottle-feeding baby, the TNAs 604 are attached to a breast pump. The milk is collected in beakers, and are measured (both by volume and by weight). The breast pump is set to typical baby's intra-oral vacuum pressure (I-O VP, measured in mmHg). Premature babies have lower I-O VP and thus need more help.

Standardized and controlled testing method is used to compare flow rates between nipple types, where that testing milk flow rates achieved by an infant during oral feeding. Nurser, Similac, at varying concentrations.

Equalizing hydrostatic pressure by maintaining an equal height from level of liquid surface to a tip of the TNA 604. Further, during emulation, the TNAs 604 are placed at 45-degree angle to mimic typical positioning of bottle feeding. Within the embodiments herein, smaller feeding channels (lumens 616) are preferred. Larger lumens 616 could result in overflow, e.g. an entire feeding occurring in under 5 minutes, which is too fast.

Mechanisms for emulating the suckling, swallowing, and breathing activity by a typical baby. For example, some data suggests have shown an infant suckles at 36 suckles/minute. The system 100 also accounts for adjusting sizes of lumen 616 to achieve specific flow rates thus achieving targeted milkflow and effective emulation.

From the above, the following 2 facts should be apparent about the system 100:

1) extensive care was taken to replicate/emulate an actual infant's feeding characteristics; and 2) any nipple-design that does not factor in good solid emulation data, is unlikely to be effective.

DISCLAIMER

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations, or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations, or equivalents. It is intended that the following claims define the scope of the invention and that methods and structures within the scope of these claims and their equivalents be covered thereby.

What is claimed is:

1. A method of manufacturing a natural nipple system, comprising:
    arranging an e-questionnaire, data repository, manufacturing environment, and insurance, retail, and e-commerce mechanism into a coordinated data system;
    the e-questionnaire gathering and processing a plurality of nipple data and baby data from a plurality of nursing moms and storing the nipple and baby data within the data repository;
    using the nipple and baby data, producing a plurality of predetermine-sizes of threaded nipple attachments that mimic shape, feel, and contour of a human nipple;
    creating a standing inventory of a plurality of the threaded nipple attachments;
    selecting a matching threaded nipple attachment for each of the nursing moms from one of a plurality of existing affirmed nipple shapes within the standing inventory;
    sending the selected threaded nipple attachment to each of the nursing moms;
    periodically sending a different threaded nipple attachment to one or more of the plurality of nursing moms; and
    the threaded nipple attachments changing over the period of time based on predetermined criteria comprising suction created by the baby, age of the baby, initial mass of the baby, final mass of the baby, length of time that suction occurred, and size of a lumen.

2. The system of claim 1, further comprising:
    changing the size of a lumen in successive threaded nipple attachments according to predetermined lactation average data.

3. The system of claim 2, further comprising:
    sending a new threaded nipple attachment every two months.

4. The system of claim 2, further comprising:
    pairing each of the plurality of nursing moms with one of the plurality of affirmed nipple shapes that is closely matched to her size, thereby increasing a chance of getting her infant to latch.

5. The system of claim 4, further comprising:
    forming the plurality of affirmed nipple shapes based on the nipple data from the plurality of nursing moms, and utilizing the plurality of affirmed nipple shapes in forming the plurality of threaded nipple attachments.

6. The system of claim 5, further comprising:
    configuring a steel liquid injection mold with the plurality of affirmed nipple shapes of the threaded nipple attachment based on nipple data from the plurality of nursing moms.

7. The system of claim 6, further comprising:
    a pneumatic press creating a lumen within each of the plurality of the threaded nipple attachments; and the pneumatic press punching the lumen to have a predetermined dimension within the nipple-shape.

8. The system of claim 7, further comprising:
    the pneumatic press applying shots of compressed concentrated air to punch through the composition/material of the each of the plurality of threaded nipple attachments.

9. The system of claim 6, further comprising:
    configuring the steel injection mold with a movable portion, a center, and a base; and configuring the movable portion with the plurality of affirmed nipple shapes.

10. The system of claim 2, further comprising:
developing target flow rates starting at preterm birth all the way through 24 months of staged breastfeeding.

11. The system of claim 10, further comprising:
each nursing mom's self-reported lactation data generating aperture (lumen) sizes, and also an average flow rate needed for each staged breastfeeding.

12. The system of claim 1, further comprising:
a plurality of e-questionnaire GUIs capturing the plurality of mom-based measurements; and the plurality of e-questionnaire prompting the nursing moms using GUIs and data-screening designed to increase data-accuracy and reduce data-errors within the threaded nipple attachments.

13. The system of claim 12, further comprising:
the e-questionnaire arranging that one or more of the plurality of nursing moms photographing her nipple using LIDAR.

14. The system of claim 1, further comprising: computing the plurality of nipple shapes using at least nipple length, nipple width, and lumen size.

15. The system of claim 1, further comprising:
affirming that the threaded nipple shape and lumen are milk-flowing at proper predetermined target rates for lactation averages obtained from the nursing moms, all the way through a 0-24 month nursing period.

16. The system of claim 15, further comprising: utilizing an optical microscope for measuring and affirming lumen diameter and flow rate data of the threaded nipple attachments.

* * * * *